United States Patent
Lan

(10) Patent No.: US 6,322,098 B1
(45) Date of Patent: Nov. 27, 2001

(54) FOLDABLE CARRIAGE

(76) Inventor: Red Lan, 15F, No. 108, Sec. 1, Hsin Tai 5th Rd., Hsichih, Taipei Hsien (TW)

( * ) Notice: Subject to any disclaimer, the term of this patent is extended or adjusted under 35 U.S.C. 154(b) by 0 days.

(21) Appl. No.: 09/609,976

(22) Filed: Jul. 5, 2000

(51) Int. Cl.[7] .................................................. B62B 7/06
(52) U.S. Cl. ........................... 280/642; 280/42; 280/650; 297/44
(58) Field of Search ................................. 280/642, 644, 280/647, 650, 47.38, 47.4, 47.371, 42; 297/42, 44, 46

(56) References Cited

U.S. PATENT DOCUMENTS

| | | | | |
|---|---|---|---|---|
| 4,386,790 | * | 6/1983 | Kassai | 280/42 |
| 4,565,388 | * | 1/1986 | Kassai | 280/650 |
| 5,181,735 | * | 1/1993 | Onishi | 280/642 |
| 5,669,623 | * | 9/1997 | Onishi | 280/642 |
| 5,979,928 | * | 11/1999 | Kuo | 280/642 |
| 6,068,284 | * | 5/2000 | Kakuda | 280/642 |

* cited by examiner

Primary Examiner—Michael Mar

(57) ABSTRACT

A foldable carriage includes a handle unit having a pair of struts, a pair of curved handgrips pivoted to the struts and connected pivotally together, and a first locking unit connected to the handgrips for locking the handgrips against pivotal movement. The carriage further includes a pair of foldable wheeled frames movable along the struts, a pair of second locking units for interlocking with the wheeled frames so as to lock the wheeled frames against movement, and a pair of transmission links connected to the handgrips and the second locking units for unlocking the second locking units.

10 Claims, 9 Drawing Sheets

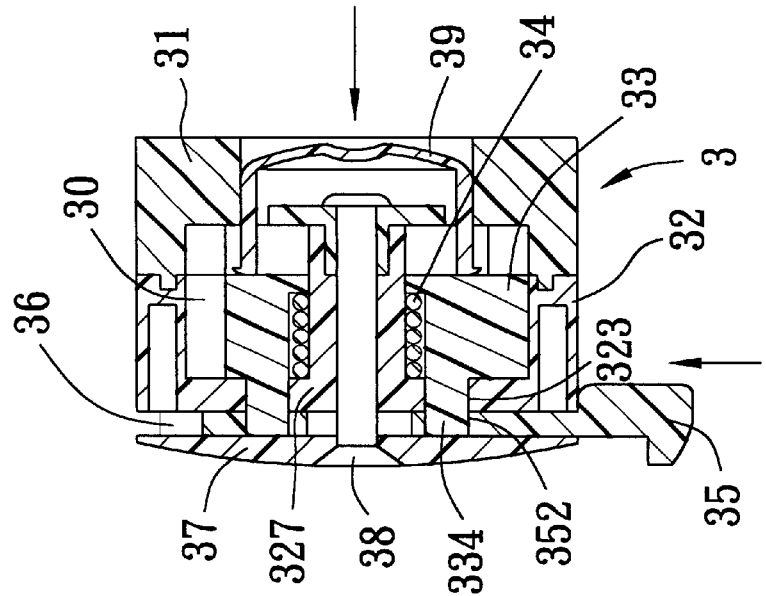
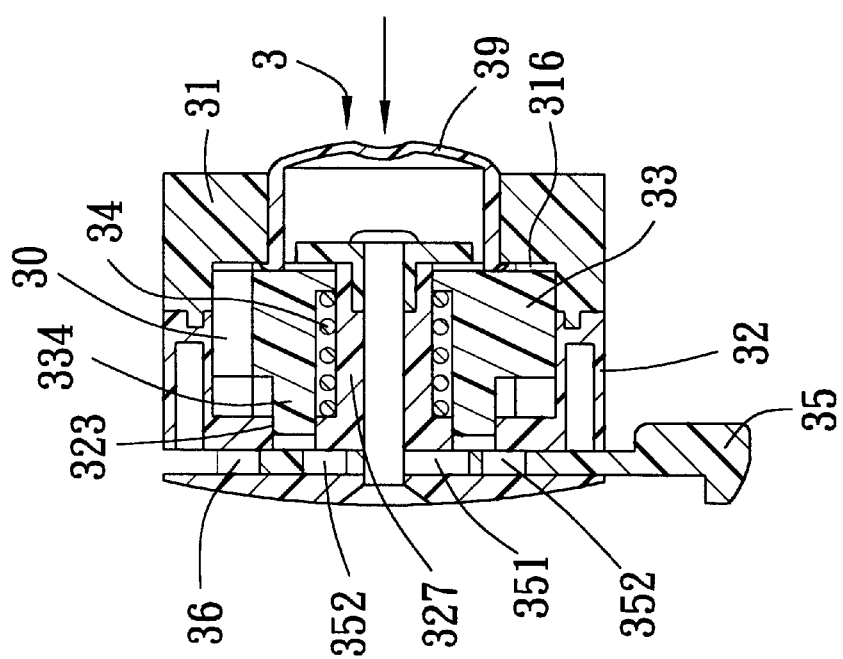

FOLDABLE CARRIAGE

BACKGROUND OF THE INVENTION

1. Field of the Invention

This invention relates to a foldable carriage, more particularly to a foldable stroller.

2. Description of the Related Art

FIG. 1 illustrates a conventional foldable stroller 1 that includes a handle portion 11, a pair of parallel struts 111 connected respectively to two opposite ends of the handle portion 11, a pair of front legs 13 (only one front leg 13 is shown) provided with front wheels 14 and mounted pivotally and respectively on the struts 111 via a pair of pivot seats 12, and a pair of rear legs 16 (only one rear leg 16 is shown) provided with rear wheels 17 and mounted pivotally and respectively on the struts 111 via a pair of pivot plates 15. The pivot seats 12 are mounted pivotally and respectively on the struts 111 via a pair of pivot pins 121, thereby permitting the front legs 13 to be turnable about the pivot pins 121 to a folded position. A locking unit 18 is mounted on each strut 111 for locking releasably the respective front leg 13 against pivotal movement about the respective pivot pin 121. Each locking unit 18 includes a transmission link 181 mounted in one of the struts 111, an actuating member 182 connected to an upper end of the transmission link 181 for moving the transmission link 181 upwardly, a locking piece 183 connected to a lower end of the transmission link 181 and having a locking recess 184 that engages releasably an upper end of the respective front leg 13, and a compression spring 185 connected to the lower end of the transmission link 181 and a bottom end of the respective strut 111 for urging the locking pieces 183 to engage the upper end of the front leg. 13. To fold the front legs 13, the locking pieces 183 are pulled upwardly and simultaneously to disengage the upper ends of the front legs 13 via the transmission links 181 by operating the actuating members 182 on the struts 111. However, such operation requires the user to use both hands to operate the actuating members 182 simultaneously, which can result in inconvenience to the user in situations, such as when the user is holding an object with one hand.

SUMMARY OF THE INVENTION

Therefore, the object of the present invention is to provide a foldable carriage that is capable of overcoming the aforementioned problem.

According to the present invention, a foldable carriage comprises: a handle unit including a pair of spaced apart struts having top and bottom ends, a pair of curved handgrips having lower ends respectively pivoted to the top ends of the struts and upper ends which are connected pivotally together, and a manually operable first locking unit connected to the upper ends of the handgrips for locking releasably the handgrips against pivotal movement, the upper ends of the handgrips being turnable relative to one another and the lower ends of the handgrips being turnable relative to the struts when the first locking unit is operated to move to an unlocking position; a pair of foldable wheeled frames each including front and rear legs which respectively have upper ends mounted movably on one of the struts below the handgrips, the wheeled frames being foldable when being moved relative to the struts; a pair of second locking units mounted respectively on the struts for interlocking with the wheeled frames so as to lock the wheeled frames against movement relative to the struts; and a pair of transmission links, each of which includes a lower end connected to one of the second locking units and an upper end connected to the lower end of one of the handgrips for actuating said one of the second lock units to release the respective one of the wheeled frames when the first locking unit is in the unlocking position.

BRIEF DESCRIPTION OF THE DRAWINGS

In drawings which illustrate an embodiment of the invention,

FIG. 5 is a cross-sectional side view of the first locking unit of FIG. 4 in a locking position;

FIG. 6 is a cross-sectional side view of the first locking unit of FIG. 4 in an unlocking position;

DETAILED DESCRIPTION OF THE PREFERRED EMBODIMENT

Figure 1:
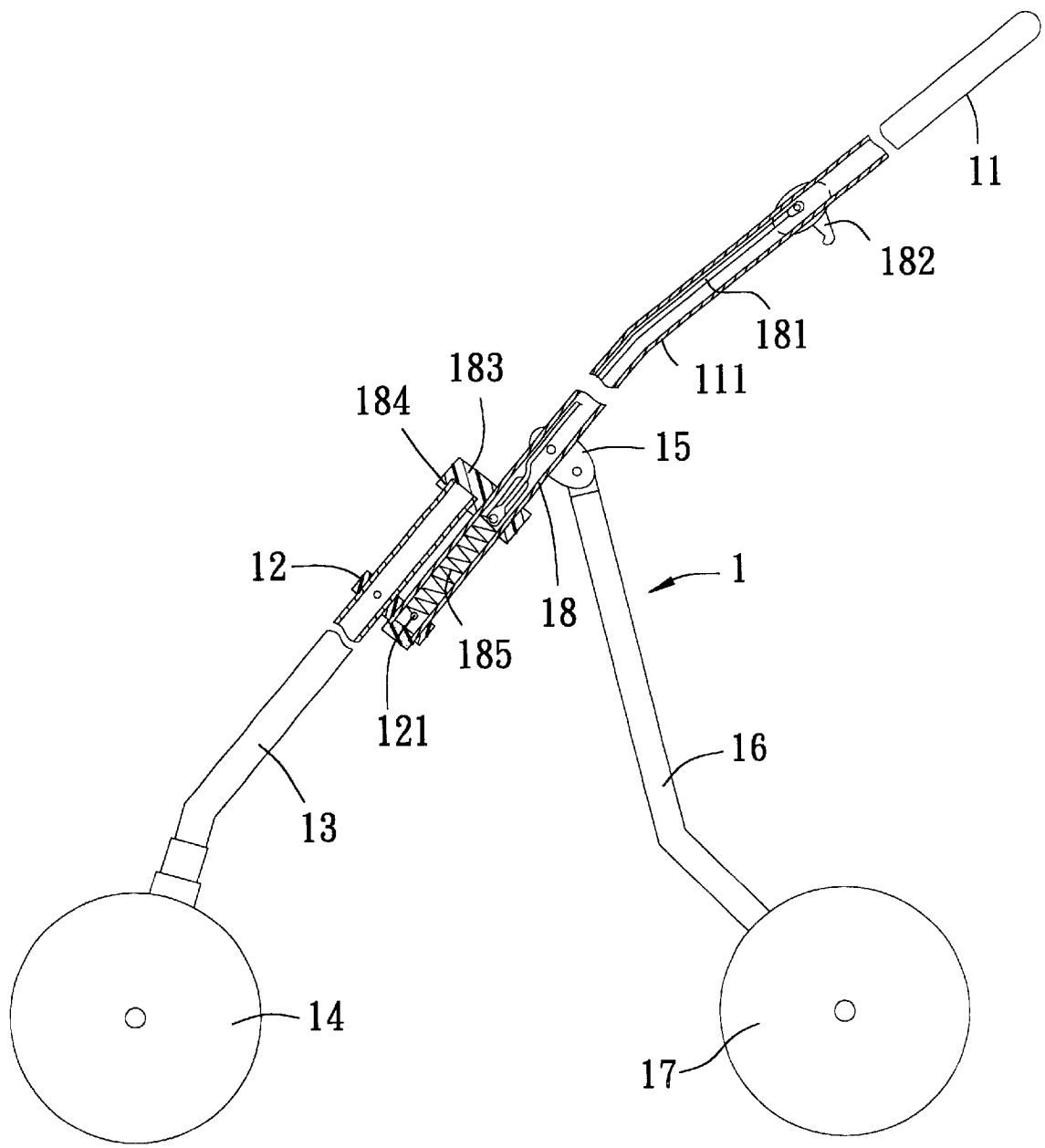
FIG. 1 is a schematic view of a conventional foldable stroller.
Figure 2:
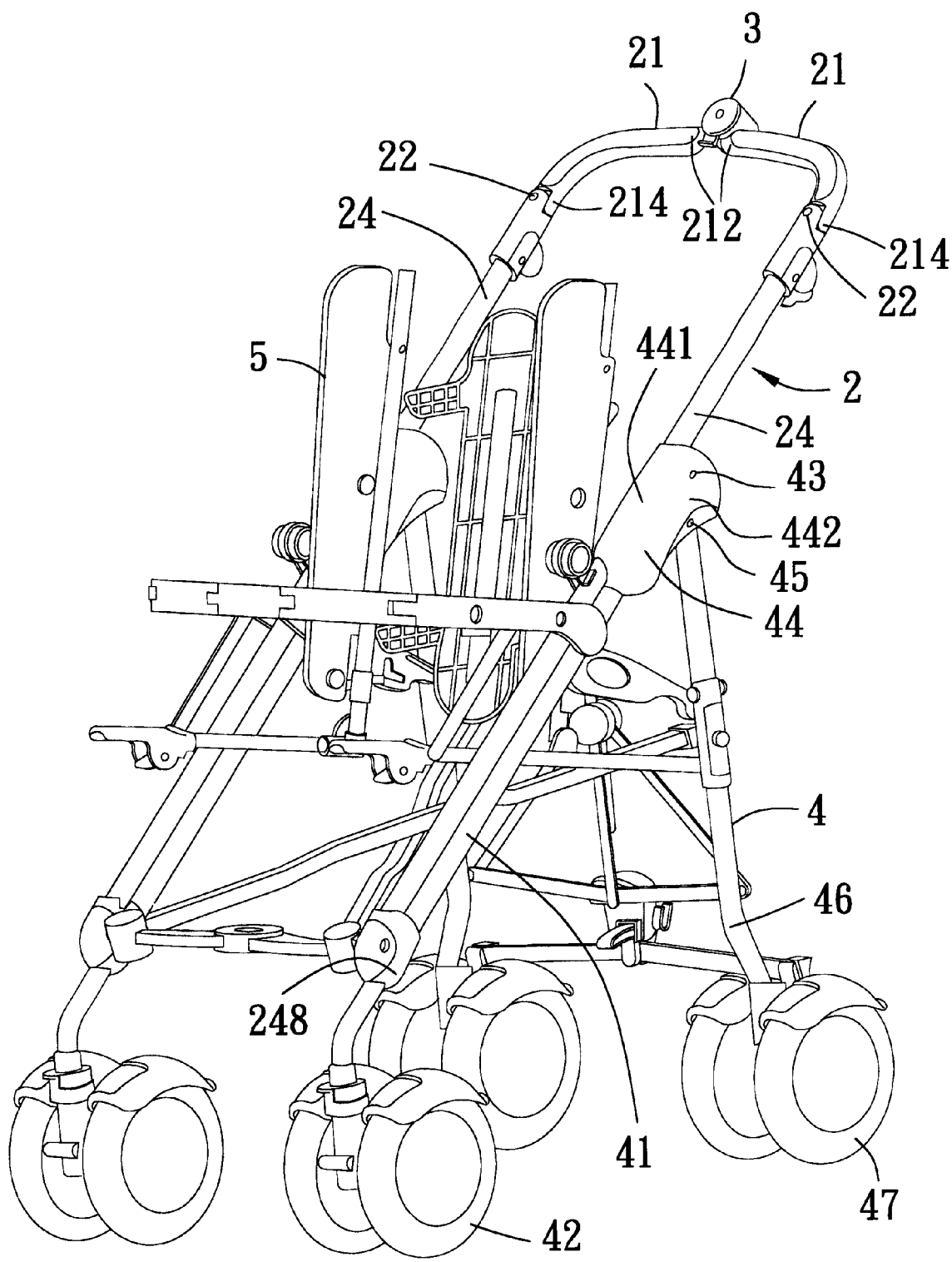
FIG. 2 is a perspective view of a foldable carriage embodying this invention.
Figure 3:
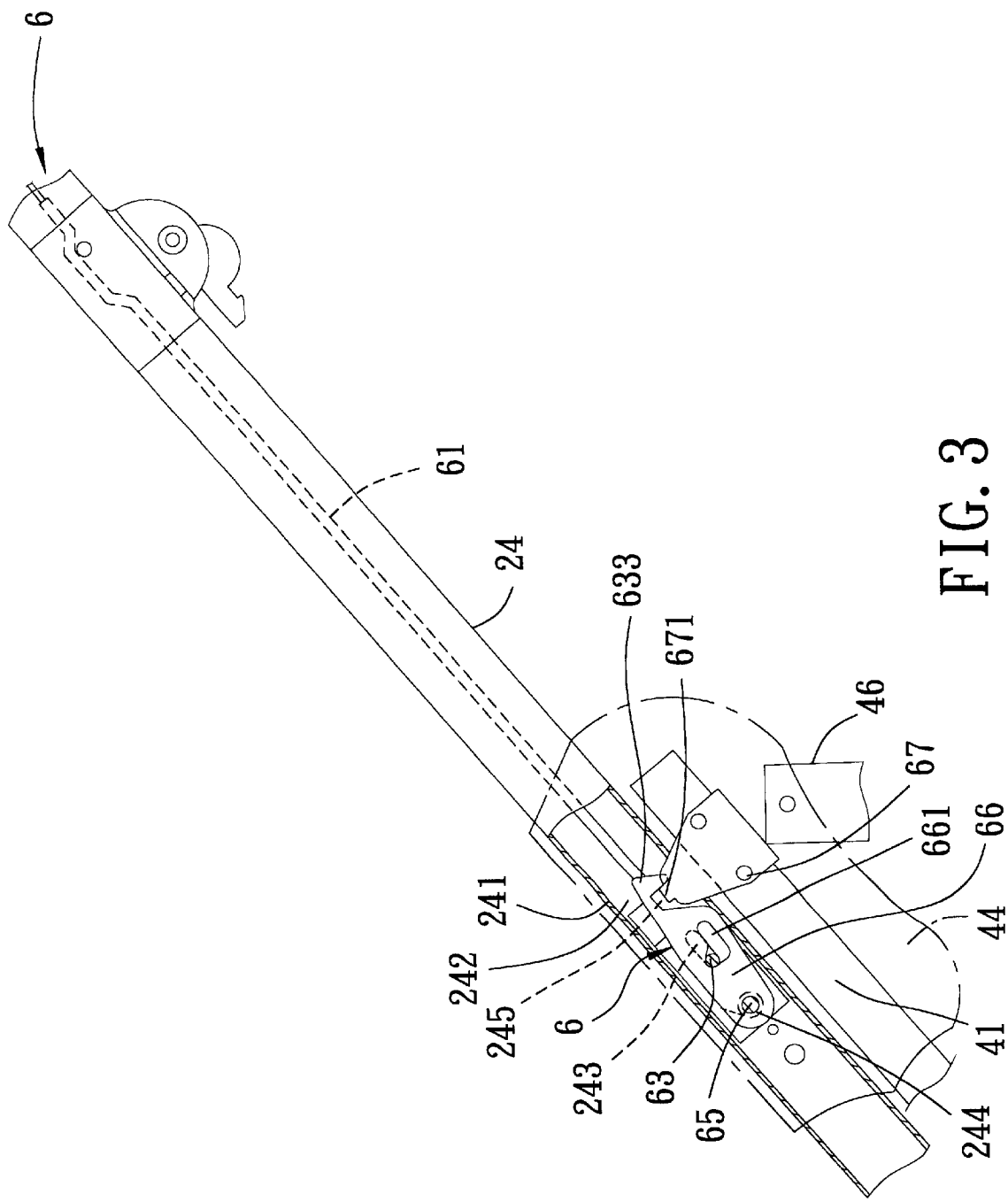
FIG. 3 is a partly cross-sectional side view showing a second locking unit of the foldable carriage of FIG. 2 in a locking position.

FIGS. 2 and 3 illustrate a foldable carriage embodying this invention. The foldable carriage includes a handle unit 2, a pair of opposite foldable wheeled frames 4 connected respectively to two opposite sides of the handle unit 2, a manually operable first locking unit 3 connected to the handle unit 2, a pair of opposite second locking units 6 mounted respectively on the wheeled frames 4, and a seat frame 5 disposed between and mounted on the wheeled frames 4.

The handle unit 2 includes a pair of spaced apart struts 24 having top and bottom ends, and a pair of opposite curved handgrips 21 having lower pivot ends 214 that are respectively pivoted to the top ends of the struts 24 via a pair of first pivot pins 22 for turning about the first pivot pins 22 and upper pivot ends 212 that are connected pivotally together via the first locking unit 3 for turning oppositely relative to one another. Each strut 24 is tubular in shape (also referring to FIG. 7), and has a tubular wall 241 that confines a tubular inner space 242 therein and that has spaced apart first and second through-holes 244, 245 disposed between the top and bottom ends of the strut 24, and an elongated slot 243 disposed between the first and second through-holes 244, 245, and extending along the length of the tubular wall 241.

Figure 4:
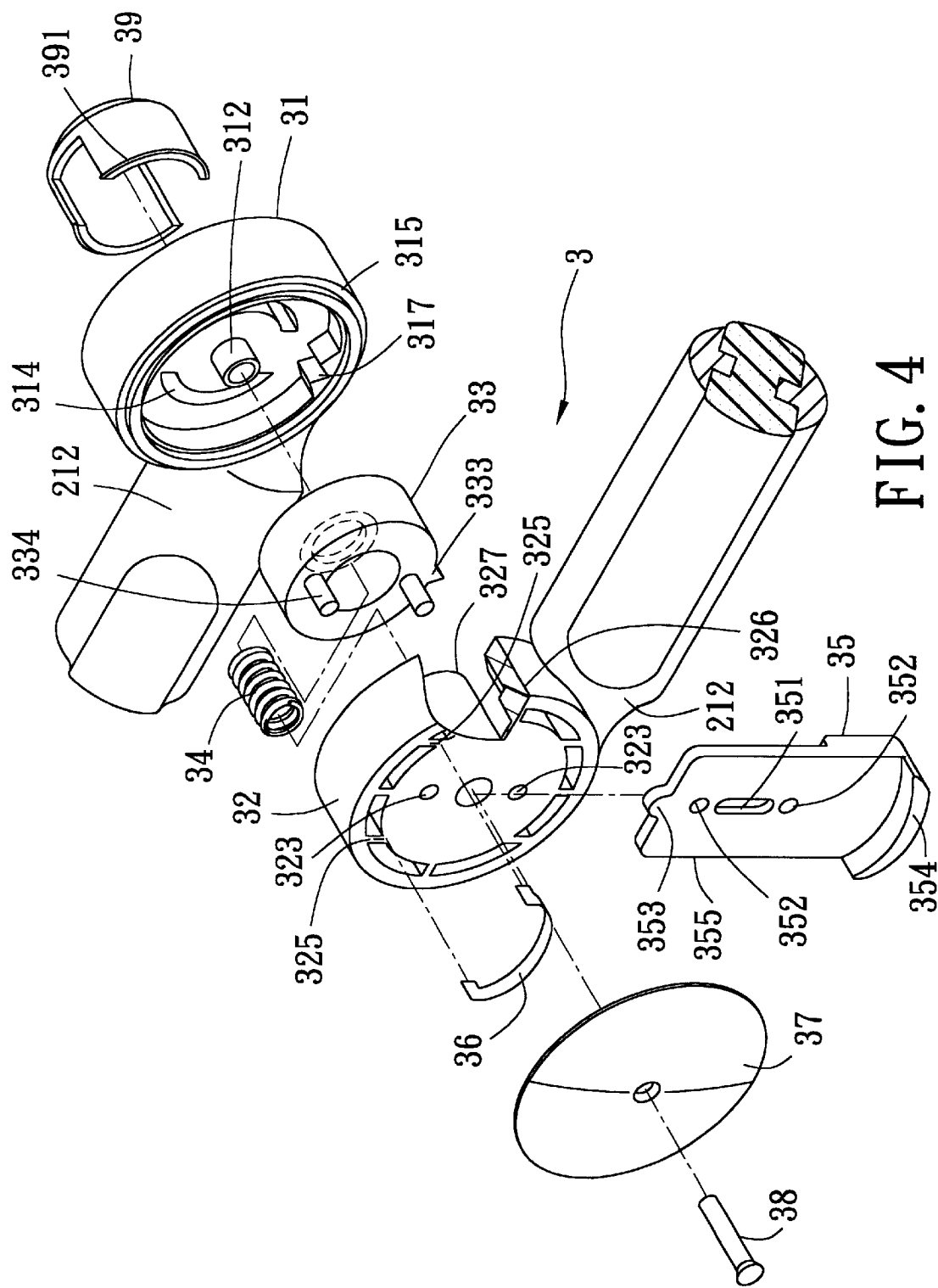
FIG. 4 is an exploded perspective view of a first locking unit of the foldable carriage of FIG. 2.

Referring now to FIGS. 4 to 6, in combination with FIGS. 2 and 3, the first locking unit 3 includes a pair of first and second cowling pieces 31, 32 which are integrally and respectively formed on the upper pivot ends 212 of the handgrips 21 and which are pivoted to each other to be turnable about a second pivot pin 38 which extends through the first and second cowling pieces 31, 32. The first and second cowling pieces 31, 32 respectively have first and second confining walls 315, 326 which are coupled and which cooperate with one another to confine an inner receiving space 30 therebetween. A first annular flange 312 projects from a central portion of the first confining wall 315 into the inner receiving space 30 for receiving the second pivot pin 38. A second annular flange 327 projects from a central portion of the second confining wall 326 into the inner receiving space 30 for receiving the first annular flange 312 and the second pivot pin 38. A locking groove 317 is formed in the first confining wall 315 inside the inner receiving space 30. A pair of opposite arcuate openings 314 are formed in the central portion of the first confining walls 315 to communicate with the inner receiving space 30. A pair of vertically aligned apertures 323 are formed in the central portion of the second confining wall 326 to communicate with the inner receiving space 30. A pair of slits 325 are formed in the central portion of the second confining wall 326 above the apertures 323.

The first locking unit 3 further includes a locking piece 33 disposed in the inner receiving space 30 and mounted rotatably on the second pivot pin 38. The locking piece 33 is configured as an annular body, and has a tongue 333 projecting radially and downwardly from a bottom end thereof for engaging releasably the locking groove 317 in the first confining wall 315 to lock releasably the handgrips 21 against pivotal movement about the second pivot pin 38, and a pair of locking pins 334 projecting axially therefrom into the apertures 323 in the second confining wall 32. The locking piece 334 is movable axially along the second pivot pin 38 between a first locking position, in which the tongue 333 engages the locking groove 317, and a first unlocking position, in which the tongue 33 disengages from the locking groove 317 to permit the handgrips 21 to turn oppositely about the second pivot pin 38. A first urging member 34, which is in the form of a compression spring, is sleeved around and abuts against the second annular flange 327, and has one end extending into and abutting against the annular body of the locking piece 33 for urging the locking piece 33 to move to the first locking position.

A pushing piece 39 is mounted movably on the central portion of the first confining wall 315, and has a pair of arcuate protrusions 391 respectively extending through the arcuate openings 314 into the inner receiving space 30 to abut against the locking piece 33 for pushing the locking piece 33 to the first unlocking position. A limiting plate 37 is disposed outwardly of the inner receiving space 30 adjacent to the second confining wall 326, and is mounted on the second pivot pin 38. A safety plate 35 is disposed between the limiting plate 37 and the second confining wall 326, and is mounted movably on the second pivot pin 38. The limiting plate 37 limits the safety plate 35 to move axially. The safety plate 35 has a pressing end 354 projecting downwardly beyond a bottom end of the second cowling piece 32, and a contacting part 355 extending upwardly from the pressing end 354. The contacting part 355 has a top protrusion 353 projecting upwardly therefrom, a pair of pin openings 352 aligned movably with the apertures 323 for receiving the locking pins 334 when the locking piece 33 is in the first unlocking position, and a vertical slot 351 disposed between the pin openings 352 and receiving the second pivot pin 38 for permitting the safety plate 35 to move upwardly and downwardly in a radial direction relative to the second pivot pin 38 between a first position, in which the contacting part 355 abuts against the locking pins 334 when the locking piece 33 is in the first locking position to revent the locking piece 33 from moving axially to the first unlocking position, and a second position, in which the pin openings 352 are aligned with the apertures 323 so as to permit the locking piece 33 to move to the first unlocking position. A second urging member 36, which is in the form of a curved elongated spring plate, is disposed between the limiting plate 37 and the second cowling piece 32 above the safety plate 35, and has two opposite ends plugging respectively into the slits 325 and a central contacting part abutting against the top protrusion 353 of the safety plate 35 for urging the safety plate 35 to move to the first position.

Each wheeled frames 4 includes a displacement seat 44 and front and rear legs 41, 46. Each displacement seat 44 is sleeved around and is movable upwardly and downwardly along one of the struts 24 between the top and bottom ends of the strut 24, and has a top portion 441 disposed above the respective strut 24, and a pair of side portions 442 extending downwardly from two opposite sides of the top portion 441. The front and rear legs 41, 46 respectively have lower ends provided with wheels 42, 47, and upper ends mounted pivotally on the side portions 442 of the displacement seat 44 via upper and lower pivot pins 43, 45, respectively. The front leg 41 of each wheeled frame 4 is substantially parallel to the respective strut 24 with the lower end thereof being supported on the strut 24 via a slidable piece 248 which is sleeved movably around the strut 24 so that the front leg 41 of each wheeled frame 4 is movable along with the displacement seat 44. The wheeled frames 4 are movable between a folded position, in which the rear legs 46 of the wheeled frames 4 turn about the upper pivot pins 43 toward the front legs 41 when the front legs 41 move upwardly toward the handle unit 2 along the struts 24, and an unfolded position, in which the rear legs 46 turn away from the front legs 41 when the front legs 41 move downwardly away from the handle unit 2 along the struts 24.

Figure 7:
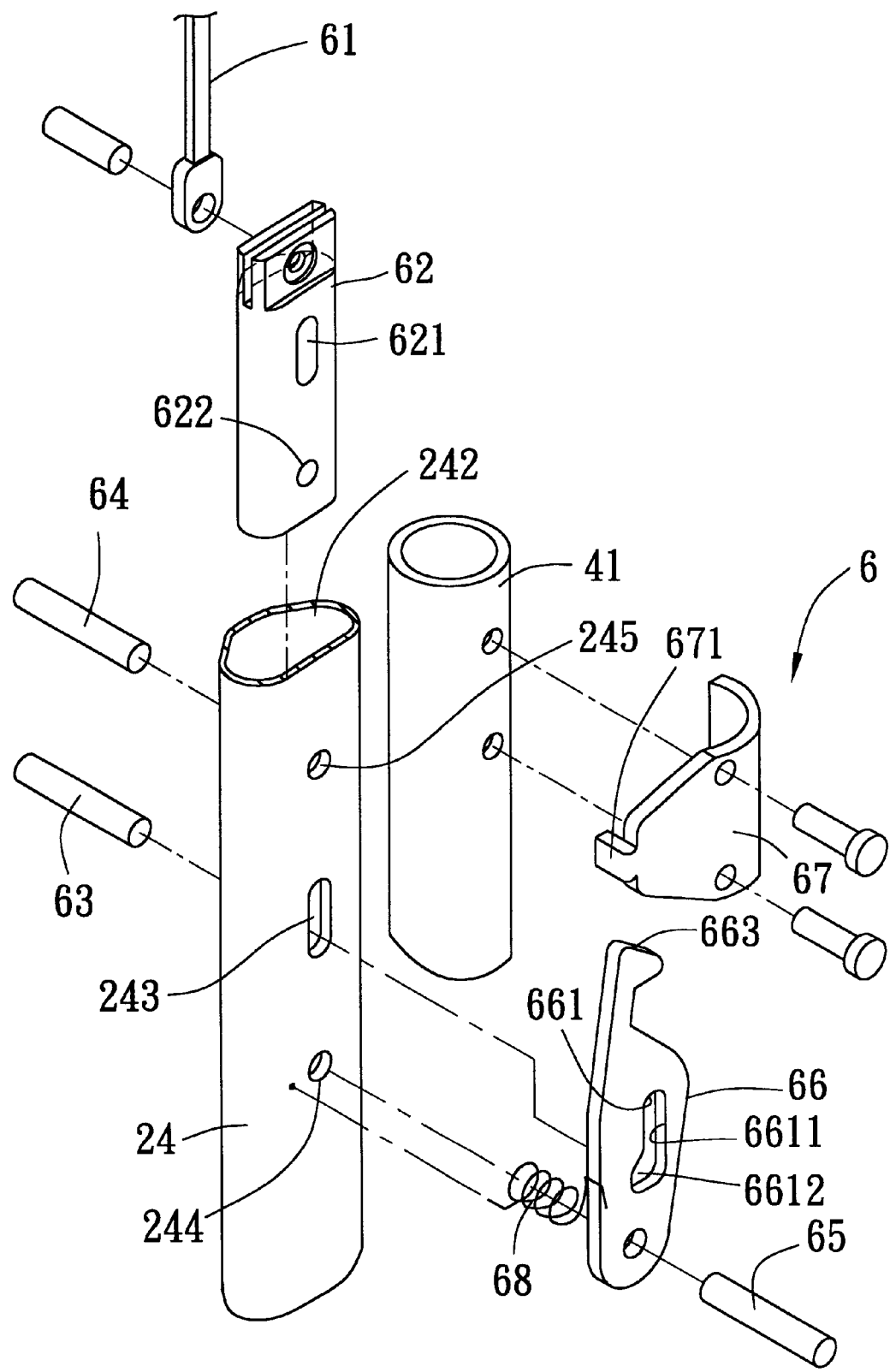
FIG. 7 is an exploded perspective view of the second locking unit of FIG. 3.
Figure 8:
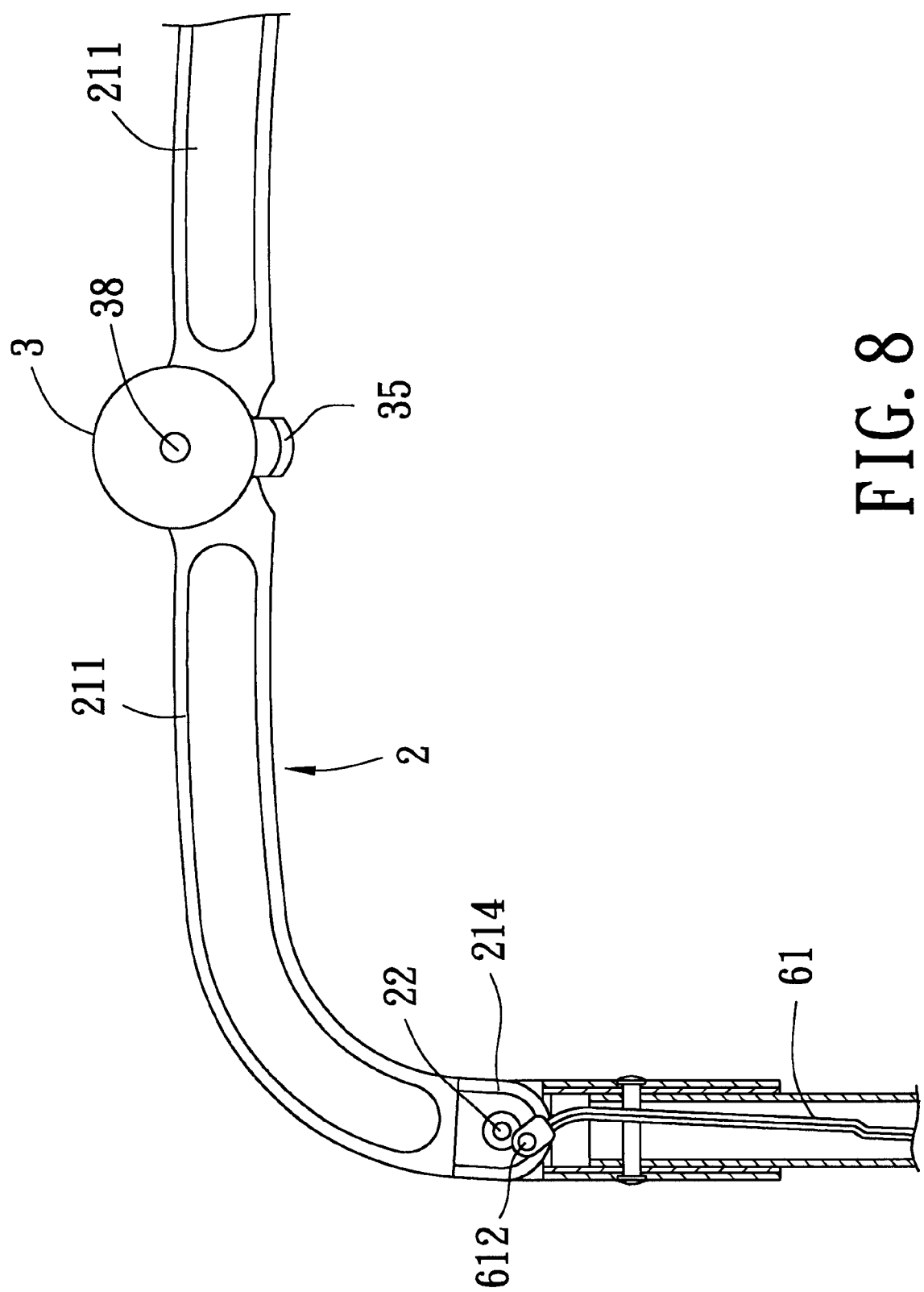
FIG. 8 is a front view of a handle unit of the foldable carriage of FIG. 2, with the first locking unit of FIG. 4 in the locking position.
Figure 9:
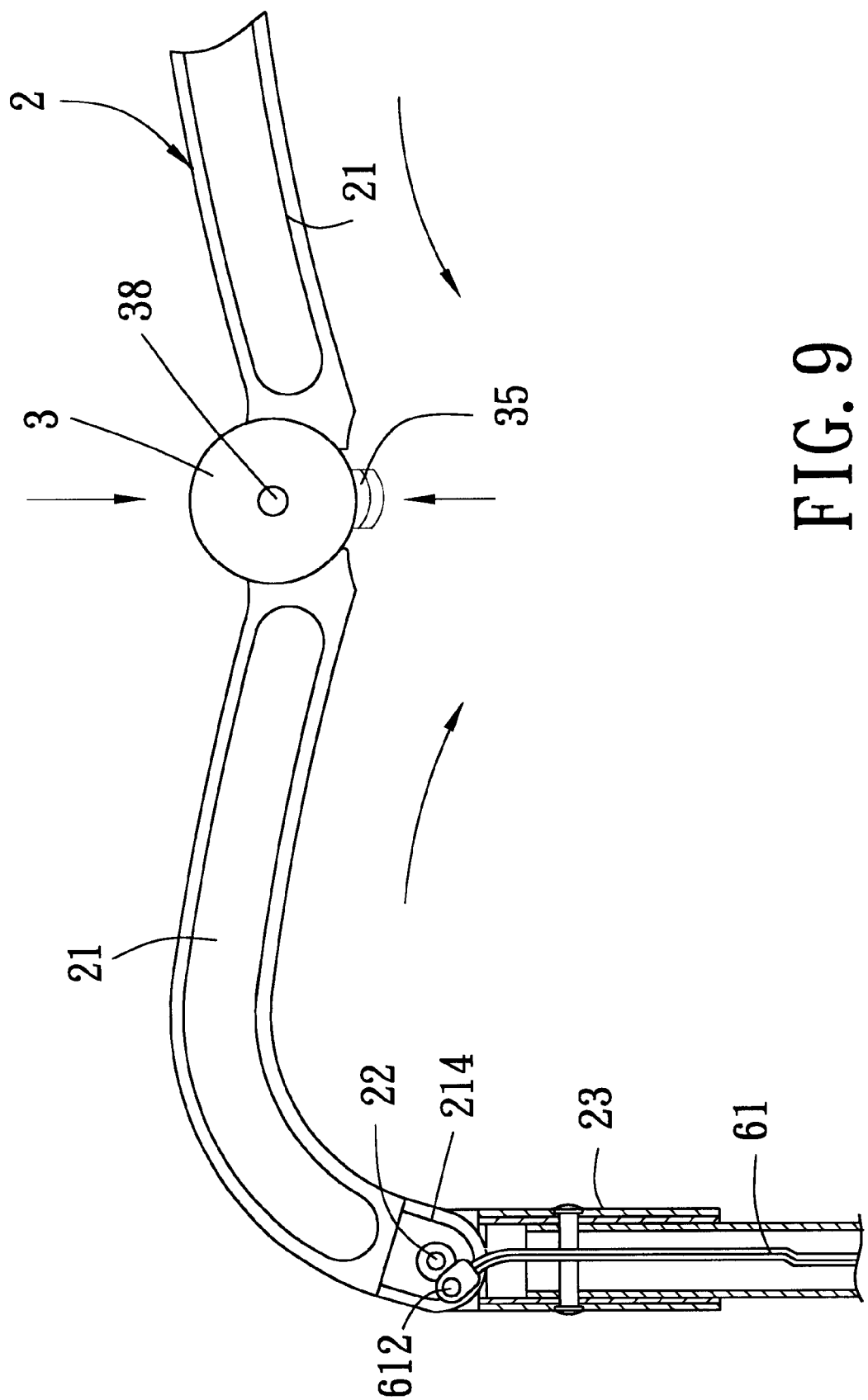
FIG. 9 is a front view of the handle unit of the foldable carriage of FIG. 2, with the first locking unit of FIG. 4 in the unlocking position.

Referring now to FIGS. 7 and 8, in combination with FIGS. 2 and 3, a transmission link 61 is disposed in the tubular inner space 242 of each strut 24, and has a lower end connected to one of the second locking units 6, and an upper end pivoted to the lower end of the respective handgrip 21 via a rivet 612 which is eccentric with respect to the corresponding one of the first pivot pins 22. Each transmission link 61 is turnable upwardly and downwardly about the respective first pivot pin 22 when the respective handgrip 21 turns about the first pivot pin 22 (see FIG. 9). A connecting piece 62 is connected to the lower end of each transmission link 61, and is disposed in the tubular inner space 242 of the respective strut 24. Each connecting piece 62 has an upper slot 621 extending along the length thereof and aligned with the first through-hole 245 in the respective strut 24, and a lower through-hole 622 aligned with the elongated slot 243 in the respective strut 24. A limiting rod 64 extends through the first through-hole 245 in each strut 24 and the upper slot 621 in the respective connecting piece 62 for limiting the movement of the respective transmission link 61 within the length of the upper slot 621 in the connecting piece 62.

Figure 10:
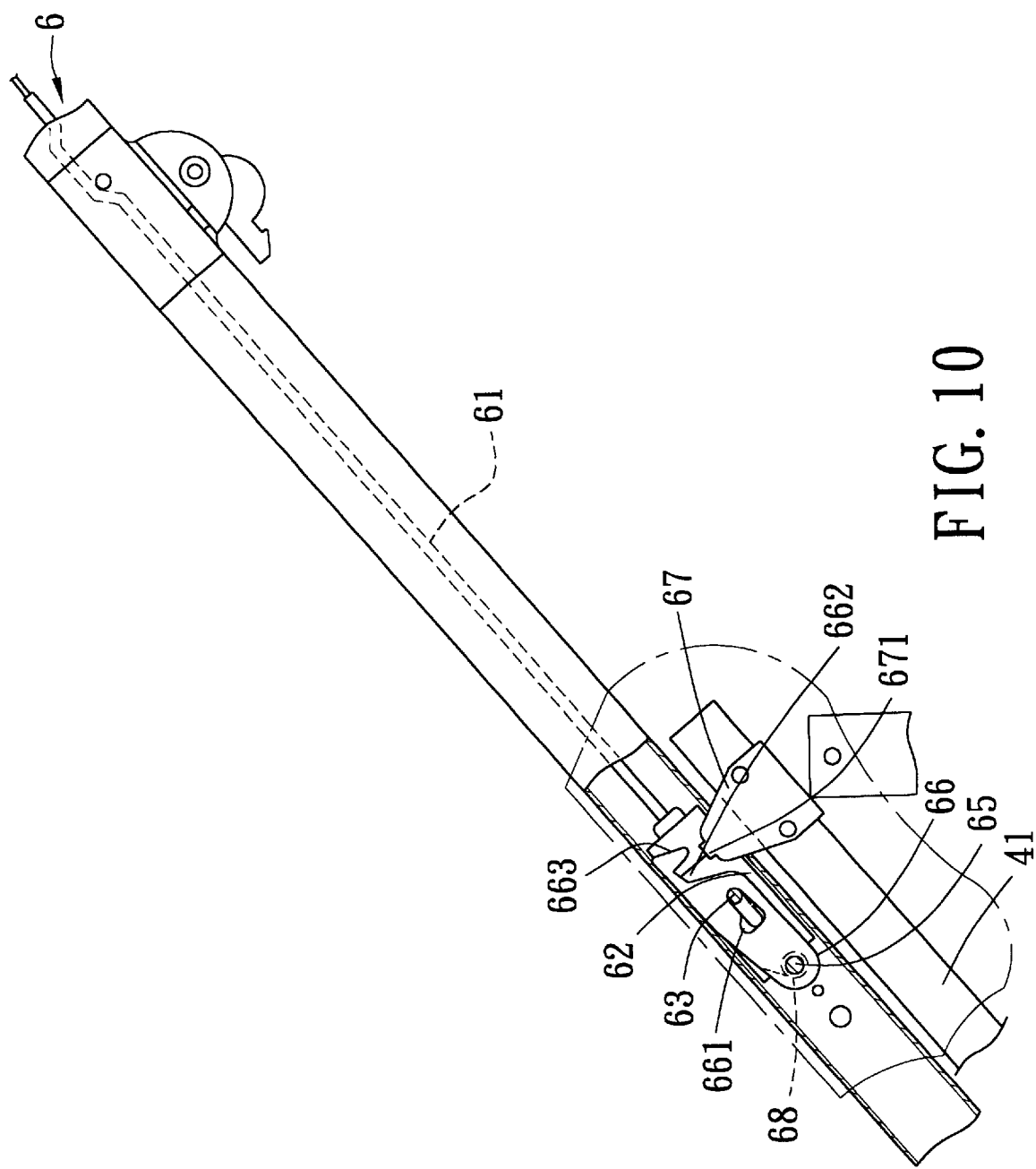
FIG. 10 is a partly cross-sectional side view of the second locking unit of the foldable carriage of FIG. 2 in an unlocking position.

Each second locking unit 6 includes a pawl plate 66 mounted pivotally on the respective strut 24 via a bolt 65 extending through the second through-hole 244 and a lower end of the pawl plate 66, and a mounting plate 67 secured to the respective one of the front legs 41 and aligned with the pawl plate 66. Each mounting plate 67 has a locking protrusion 671 projecting toward the respective pawl plate 66. The pawl plate 66 of each second locking unit 6 has an upper hooked end 663 and an L-shaped hole 661 disposed between the lower end and the upper hooked end 663 thereof and aligned with the elongated slot 243 in the respective strut 24, and is turnable about the bolt 65 between a second locking position, in which the upper hooked end 663 engages the locking protrusion 671 (see FIG. 3), and a second unlocking position, in which the upper hooked end 663 disengages from the locking protrusion 671 (see FIG. 10). The L-shaped hole 661 has an elongated first part 6611 extending along the length of the pawl plate 66, and a second part 6612 widened transversely of the first part 6611 from one end of the first part 6611. An actuating member 63, which is in the form of a bolt, extends through the elongated slot 243 in one of the struts 24, the lower through-hole 622 in the respective connecting piece 62, and the L-shaped hole 661 in the respective pawl plate 66 for moving the respective pawl plate 66 to the second unlocking position upon moving from the second part 6612 of the L-shaped hole 661 to the first part 6611 of the L-shaped hole 661 (see FIG. 10). A third urging member 68, which is in the form of a torsion spring, is sleeved around the bolt 65 to urge the pawl plate 66 of each second locking unit 6 to move to the second locking position when the actuating member 63 is in the second part 6612 of the L-shaped hole 661.

To move the second locking units 6 to the second unlocking position for permitting the wheeled frames 4 to move to the folded position, the pressing end 354 is pressed upwardly to move the safety plate 35 to the second position, and the pushing piece 39, which is enabled to move now, is subsequently pressed to move the first locking unit 3 to the first unlocking position, thereby permitting the handgrips 21 to turn about the first pivot pins 22 to actuate the actuating members 63 and unlock the second locking units 6. The aforesaid pushing action acting on the pushing piece 39 can be accomplished by using a thumb, while the pressing action acting on the pressing end 354 of the safety plate 35 can be accomplished by other fingers on the same hand, thereby overcoming the aforesaid inconvenience associated with the prior art. It is noted that the inclusion of the safety plate 35 in the first locking unit 3 is only a preferred embodiment of this invention, and can be dispensed. As such, the folding operation of the wheeled frames 4 for the first locking unit 3 without the safety plate 35 becomes even simpler than that with the safety plate 35.

With the invention thus explained, it is apparent that various modifications and variations can be made without departing from the spirit of the present invention. It is therefore intended that the invention be limited only as recited in the appended claims.

I claim:

1. A foldable carriage, comprising:
    a handle unit including a pair of spaced apart struts having top and bottom ends, a pair of curved handgrips having lower ends respectively pivoted to said top ends of said struts and upper ends which are connected pivotally together, and a manually operable first locking unit connected to said upper ends of said handgrips for locking releasably said handgrips against pivotal movement, said upper ends of said handgrips being turnable relative to one another and said lower ends of said handgrips being turnable relative to said struts when said first locking unit is operated to move to an unlocking position;
    a pair of foldable wheeled frames each including front and rear legs which respectively have upper ends mounted movably on one of said struts below said handgrips, said wheeled frames being foldable when being moved relative to said struts;
    a pair of second locking units mounted respectively on said struts for interlocking with said wheeled frames so as to lock said wheeled frames against movement relative to said struts; and
    a pair of transmission links, each of which includes a lower end connected to one of said second locking units and an upper end connected to said lower end of one of said handgrips for actuating said one of said second lock units to release the respective one of said wheeled frames when said first locking unit is in said unlocking position.

2. The foldable carriage of claim 1, wherein said lower end of each of said handgrips has a first pivot pin which is mounted thereon and which passes transversely through said top end of a corresponding one of said struts, said upper end of each of said transmission links being pivoted to said lower end of the corresponding one of said handgrips via a rivet which is eccentric with respect to said first pivot pin.

3. The foldable carriage of claim 2, wherein each of said wheeled frames further includes a displacement seat sleeved around and movable along one of said struts between said top and bottom ends of the strut, said upper end of said front leg being mounted on said displacement seat substantially in parallel with said one of said struts so as to be movable along with said displacement seat and interlockable with a respective one of said second locking units, said upper end of said rear leg being pivoted to said displacement seat.

4. The foldable carriage of claim 2, wherein said first locking unit includes first and second cowling pieces which are respectively connected to said upper ends of said handgrips and which are pivoted to each other to be turnable about a second pivot pin, said first and second cowling pieces having confining walls which cooperate with one another to confine an inner receiving space therebetween, said first locking unit further including a locking piece which is mounted rotatably inside said inner receiving space about said second pivot pin and which is movable axially between a first locking position, in which said locking piece engages one of said confining walls to stop rotational movement of said first and second cowling pieces about said second pivot pin, and a first unlocking position, in which said locking piece disengages from said one of said confining walls.

5. The foldable carriage of claim 4, wherein said first locking unit further includes a pushing piece connected to said locking piece for pushing said locking piece to said first unlocking position, and a first urging member for urging said locking piece to move to said first locking position.

6. The foldable carriage of claim 5, wherein said locking piece has an annular body, a tongue projecting radially from said annular body, and a pair of locking pins projecting axially from said annular body, said confining wall of said first cowling piece having a groove formed therein for engaging releasably said tongue when said locking piece is in said first locking position, said confining wall of said second cowling piece having a pair of apertures for receiving and engaging respectively said locking pins, said pushing piece being mounted movably on said first cowling piece, said first urging member being a compression spring disposed between and abutting against said confining wall of said second cowling piece and said locking piece.

7. The foldable carriage of claim 6, wherein said first locking unit further includes a limiting plate disposed outwardly of said inner receiving space adjacent to said second cowling piece and mounted on said second pivot pin, and a safety plate disposed between said limiting plate and said second cowling piece and having a contacting part that extends radially relative to said second pivot pin and that has a pair of openings aligned movably and respectively with said apertures for receiving said locking pins when said locking piece is in said first unlocking position, said limiting plate limiting said safety plate to move axially, said safety plate being movable in a radial direction relative to said pivot pin between a first position, in which said contacting part abuts against said locking pins to prevent said locking piece from moving axially to said first unlocking position when pushed by said pushing piece, and a second position, in which said openings are aligned with said apertures so as to permit said locking piece to move to said first unlocking position, said first locking unit further including a second urging member disposed between said limiting plate and said second cowling piece above said contacting part of said safety plate for urging said safety plate to move to said first position.

8. The foldable carriage of claim 3, wherein each of said second locking units includes a pawl plate mounted pivotally on a corresponding one of said struts adjacent to said lower end of said transmission link to swing transversely relative to said one of said struts, said pawl plate being engageable with said upper end of one of said front legs, said lower end of said transmission link having an actuating member to disengage said pawl plate from said one of said front legs.

9. The foldable carriage of claim 8, wherein said upper end of each of said front legs has a mounting plate secured thereto, said mounting plate having a protrusion projecting toward said pawl plate, said pawl plate being biased to engage said protrusion, said actuating member moving said pawl plate to disengage said pawl plate from said protrusion in said unlocking position of said first locking unit.

10. The foldable carriage of claim 9, wherein said pawl plate has a substantially L-shaped hole which has a first part elongated longitudinally relative to the corresponding one of said struts and a second part widened transversely of said first part, said actuating member being a bolt which passes through said L-shaped hole and which is slidable between said first and second parts of said L-shaped hole.

* * * * *